United States Patent [19]

Johansson et al.

[11] Patent Number: 5,048,159
[45] Date of Patent: Sep. 17, 1991

[54] HOSE CLAMP

[75] Inventors: Jan-Olof Johansson; Evert Karlsson, both of Anderstorp, Sweden

[73] Assignee: Anderstorps Werkstads Aktiebolag, Anderstorp,

[21] Appl. No.: 119,700

[22] Filed: Nov. 12, 1987

[51] Int. Cl.⁵ .............................................. F16L 33/02
[52] U.S. Cl. ................................. 24/20 R; 24/20 EE
[58] Field of Search ............ 24/20 R, 20 EE, 20 TT, 24/20 S, 27, 19, 557, 530, 563, 565; 248/74.1, 74.2, 74.5; 285/420

[56] References Cited

U.S. PATENT DOCUMENTS

| | | |
|---|---|---|
| 2,817,130 | 12/1957 | Roberts et al. |
| 3,131,444 | 5/1964 | Manning ............................ 24/27 |
| 3,204,901 | 9/1965 | Dunn . |
| 3,259,262 | 7/1966 | Grossman et al. ........... 24/20 EE X |
| 4,380,096 | 4/1983 | Nishida . |
| 4,425,681 | 1/1984 | Ilius ................................ 24/20 S |
| 4,425,682 | 1/1984 | Hashimoto et al. .......... 24/20 R X |
| 4,708,377 | 11/1987 | Hunting ........................ 24/20 S X |

FOREIGN PATENT DOCUMENTS

| | | | |
|---|---|---|---|
| 2553154 | 4/1985 | France ................................. 24/20 S |
| 35748 | 8/1919 | Netherlands ........................... 24/19 |
| 1560606 | 2/1980 | United Kingdom ............... 24/20 R |

Primary Examiner—James R. Brittain
Attorney, Agent, or Firm—Fleit, Jacobson, Cohn, Price, Holman & Stern

[57] ABSTRACT

In an elastic cylindrical hose clamp consisting of a rectangular and uniformly thick resilient plate having a first gripping lug protruding centrally from one side of the plate and two gripping lugs protruding from the opposite side of the plate at each their own side of the first lug, said lugs at their free ends having radially outwards protruding tongues to be used when expanding the clamp, the tongue of the first lug being so designed as to engage and travel along the track defined between said second lugs, the amendment that said three lugs are designed broader adjacent to the rectangular plate than at their free ends.

4 Claims, 1 Drawing Sheet

HOSE CLAMP

The present invention relates to hose clamps and more particularly, to an improvement in a hose clamp formed of an elastic flat material.

The U.S. Pat. No. 4,380,096 describes and shows as prior art a conventional hose clamp having an annular clamping portion consisting of an elastic rectangular plate with constant width, a first gripping end portion or lug and a pair of second gripping end portions or lugs at each of their own side of said first lug and designed to expand the diameter of the clamping portion by means of tongues protruding radially from the ends of the three lugs.

However, such a hose clamp is not constructed to accurately considering the bending moment and other forces or stresses produced at the respective positions on the clamping portion owing to the clamping force of the gripping end portions or lugs and specially to the bending force on said lugs at their base portions adjacent to the rectangular plate.

A primary object of the invention is to provide a hose clamp taking in consideration the effect of said bending forces.

According to one respect of this invention, there is provided an improved hose clamp having an in the main rectangular and uniformly thick resilient plate, a first gripping lug protruding centrally from one side of the plate and two second gripping lugs protruding from the opposite side of the plate at each their own side of the first lug, the ends of the lugs having a radially outwards protruding tongue to use when expanding the clamp, the tongue of the first lug being so designed as to engage and travel along the track defined between said second lugs, whereby said three lugs being broader at their bases adjacent to the rectangular plate than at their free ends.

According to another respect of the invention the peripheral extension of said resilient lugs is greater than the peripheral extension of said rectangular plate.

According to a further respect of the invention there is provided a hose clamp of the above mentioned kind, at which the ends of said second lugs being connected by a transverse strip.

The foregoing and other objects and features of the invention will be apparent from the detailed description below and the accompanying drawings, in which.

Figure 1:
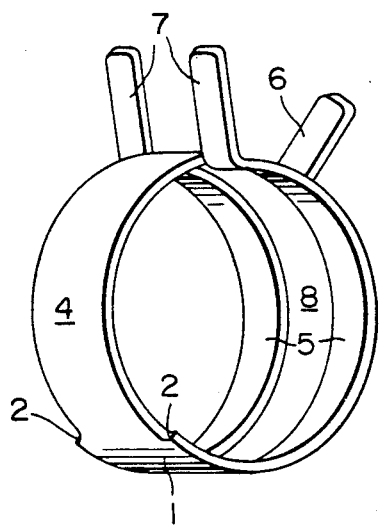
FIG. 1 is a perspective view of one embodiment of a hose clamp constructed according to this invention.
Figure 2:
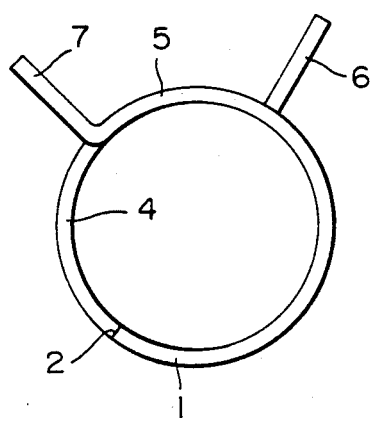
FIG. 2 is a side view of the hose clamp.
Figure 3:
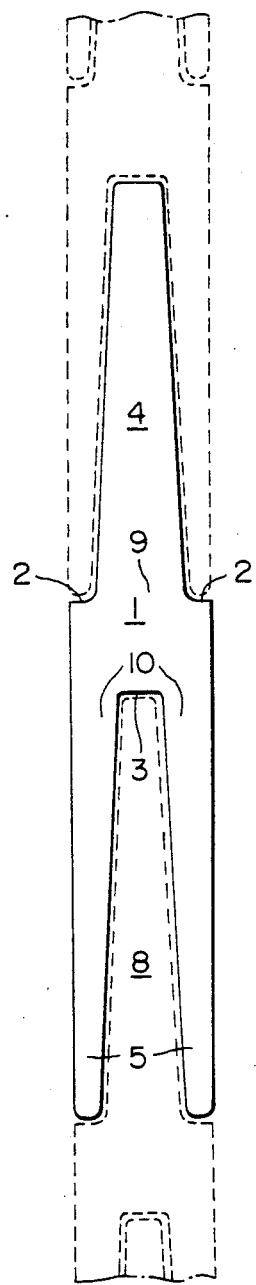
FIG. 3 is a plane view of a sheet material before its forming to a hose clamp.

Referring now to the drawing and particularly to FIGS. 1 to 3, one perferred embodiment as shown therein consists of an in the main rectangular and uniformally thick resilient plate 1. From opposite sides 2 and 3 of the plate protrude gripping lugs 4 and 5 respectively, which are bended in an annular shape to be able to grip a hose or similar. Thus a first lug 4 protrudes centrally from one side 2 of the rectangular plate and two second gripping lugs 5 protrude from the opposite side 3 of the plate and on each their own side of the first lug 4. Said three lugs have radially outwards protruding tongues 6 and 7 respectively to be used when expanding the clamp at its fixing on a hose not shown. Hereby the tongue 6 of the first lug 4 is so designed as to engage and travel along the track 8 defined between said second lugs 5.

According to the invention said three lugs 4 and 5 are broader at their bases 9 and 10 respectively adjacent to the rectangular plate 1 than at their free ends. This circumstance gives the three lugs a stronger attachment to the rectangular plate. Further this gives the three lugs a shape tapering towards their free ends. Futhermore said tapering shape will contribute to the desirable distribution of the different stresses as produced at different positions along the periphery of the clamp.

In the hose clamp as shown the peripheral extension of each of the three lugs 4 and 5 is greater than the peripheral extension of the rectangular plate 1 and this will cooperate to the favourable distribution of the different stresses which is futher enhanced due to the tapering shapes of the lugs.

Raw material for hose clamps as shown in FIGS. 1 to 3 can be punched one after another from a steel band without noticeable loss of material. This is illustrated in FIG. 3, in which with continous lines the raw material for one hose clamp is indicated and with short dashed lines raw material for hose clamps situated before and after last mentioned hose clamp. From FIG. 3 one can learn that in the march of hose clamps as punched out from a steel band the lugs 4 fits in the tracks 8 as defined by the lugs 5 of a foregoing or following hose clamp.

Figure 4:
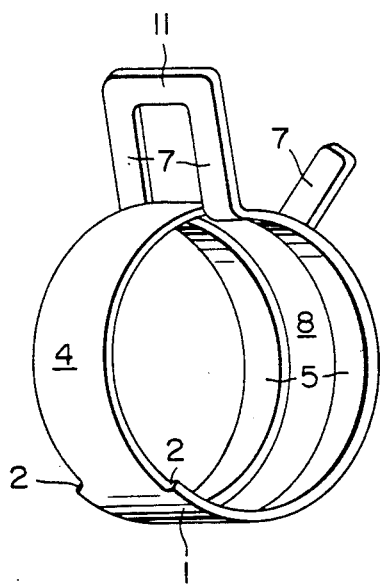
FIGS. 4 to 6 are views corresponding to FIGS. 1 to 3 respectively of another embodiment of a hose clamp according to the invention.
Figure 5:
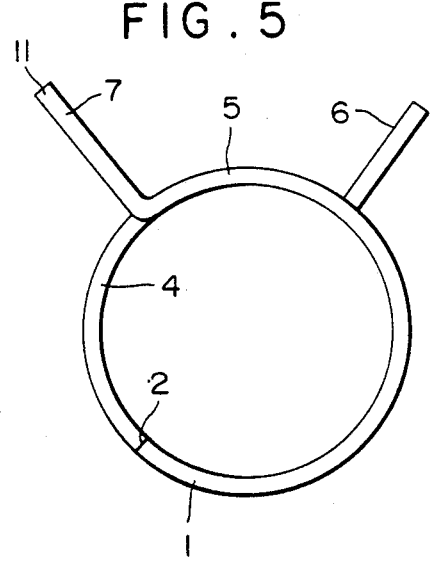
Figure 6:
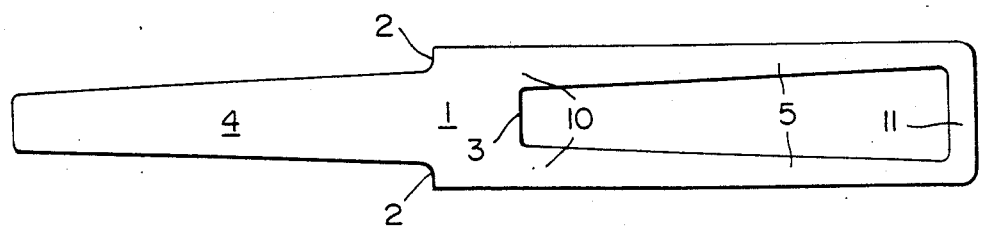

The embodiment of the hose clamp as shown in FIGS. 4 to 6 has been provided in order to facilitate the approaching of the tongues 6 and 7 to each other when expanding the hose clamp. This is achieved by a transverse strip 11, which connects the ends of the tongues 7 of the second lugs 5. The manufacture of clamps of this more comfortable kind necessitates a certain loss of plate material due to the fact that the strip makes it impossible to place the lug 4 between the lugs 5 of an adjacent hose clamp, when punching raw materials to the hose clamps.

What is claimed is:

1. In a cylindrical hose clamp having a rectangular and uniformly thick resilient plate, a first gripping lug protruding centrally from one side of the plate and two second gripping lugs protruding from the opposite side of the plate at opposite sides of the first lug respectively, the lugs having ends, each of which defines a radially protruding tongue to use when expanding the clamp, the tongue of the first lug being adapted to engage and travel along a track defined between said second lugs, the improvement that said three lugs are broader adjacent the rectangular plate than at the ends, the lugs each have junction with the plate and taper from the junction to their respective ends, and the periphral extension of each lug is greater than the peripheral extension of the plate.

2. In a hose clamp as in claim 1, the improvement by which the tongues of said second lugs being connected by a transverse strip.

3. In a hose clamp as in claim 1 wherein said first lug is dimensioned to fit in the track between said second lugs.

4. In a cylindrical hose clamp having a rectangular and uniformly thick resilient plate having longer sides and shorter sides, a first gripping lug protruding from one side of the plate, a pair of second lugs projecting from an opposite side of the plate, said second lugs being situated on opposite sides of the first lug respectively, the lugs having ends defining radially protruding tongues to be used when expanding the clamp, whereby the tongue of the first lug engages and travels along a track defined between said second lugs, the improvements in that said three lugs protrude from the longer sides of the rectangular plate and are broader adjacent said plate than at their ends, each lug having a junction with the plate and tapering from the junction to its respective end.

* * * * *